E. P. Cooley.
Broom.

No. 56,717. Patented Jul. 31, 1866.

Witnesses.

Inventor.
E. P. Cooley.
Per Munn & Co.
Attys.

UNITED STATES PATENT OFFICE.

E. P. COOLEY, OF NEW YORK, N. Y.

IMPROVED BROOM.

Specification forming part of Letters Patent No. 56,717, dated July 31, 1866.

*To all whom it may concern:*

Be it known that I, E. P. COOLEY, of the city, county, and State of New York, have invented a new and useful Improvement in Brooms; and I do hereby declare that the following is a full, clear, and exact description thereof, which will enable others skilled in the art to make and use the same, reference being had to the accompanying drawings, forming part of this specification.

The present invention relates to a novel manner of securing broom-corn or other material ordinarily used for brooms to the handle or holder for the same, whereby simplicity, cheapness, and durability are obtained, as will be obvious from the following detail description of the same, reference being had to the accompanying plate of drawings, in which—

Figure 2:
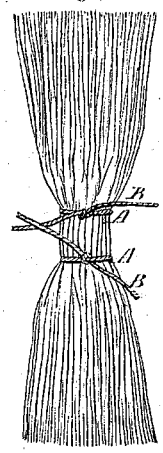
Figure 1:
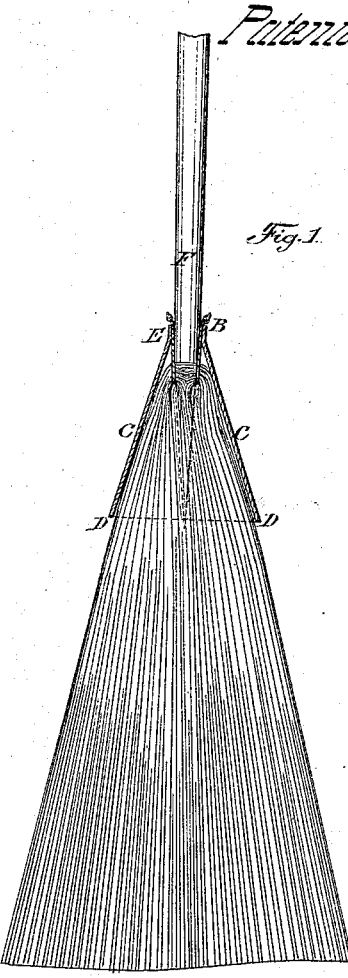
Figure 3:

Figure 1 is a central section through a broom, taken in the direction of its length; Figs. 2 and 3, detail views, to be hereinafter referred to.

In securing the broom-corn or other material used to the handle or holder, under the present invention, each section of the broom-corn that is to constitute the broom, at its stalk portion or end, is first spliced, (see Fig. 3,) so as to enable such ends to form a more perfect and compact bunch when placed together, with their other or loose ends extending in opposite directions, as plainly shown in Fig. 2 of the drawings, in which position they are firmly fastened or secured by encircling or binding the said stalk portions with two or more cords, ropes, or other lines, A, and then tightly tying such cords, leaving loose ends B to the same. The broom-corn is then doubled up, as it were, or bent over, so as to bring its loose ends together when passing the ends B of the cords A through the conical-shaped holder or head C, (which may be made of any of the ordinary but suitable styles and shapes now in common use, and of any material, such as sheet tin, brass, &c.,) with the bound portion of the broom-corn in the larger end D of the said holder. The broom-corn is then, by means of said cords, drawn up and into the said holder or head toward its smaller end E until brought to the proper and desired position therein, when, having tied a knot in the ends of the cords at the smaller end of the holder or head C, one end of the handle stick or rod F is then driven through such end of the holder into the broom-corn, thereby tightly binding, holding, and fastening the said ends between it and the edge of the smaller end or mouth of the holder, as is obvious without any further explanation, the said handle-stick, in order to facilitate its being driven into the broom-corn, as above described, being pointed or sharpened, as shown in Fig. 1.

From the above it is plainly apparent that by my improvement in brooms broom-corn can be securely fastened to its handle or holder, and in a most simple, cheap, and effective manner, and in such a way as to be within the capability and scope of any person whether possessing more or less mechanical skill or aptitude, no tools or implements of any kind, except what are in common use and in the possession of all families, or nearly so, being required, thus greatly increasing its desirability, utility, and practicability for domestic purposes, and a broom under my invention being susceptible of manufacture at a much less expense than any broom now in common use or heretofore invented or patented.

Having thus described my invention, I claim as new and desire to secure by Letters Patent—

The combination of the cords A, having knotted ends B, the conical cap C, and pointed handle F, with the stalks, arranged and operating substantially in the manner and for the purpose herein represented and described.

The above specification of my invention signed by me this 19th day of June, 1866.

E. P. COOLEY.

Witnesses:
WM. F. MCNAMARA,
ALBERT W. BROWN.